United States Patent
Janssens

(10) Patent No.: US 10,635,705 B2
(45) Date of Patent: Apr. 28, 2020

(54) METHODS, SYSTEMS AND COMPUTER READABLE STORAGE MEDIA FOR DETERMINING RELEVANT DOCUMENTS BASED ON CITATION INFORMATION

(71) Applicant: Emory University, Atlanta, GA (US)

(72) Inventor: Anna Janssens, Atlanta, GA (US)

(73) Assignee: Emory University, Atlanta, GA (US)

( * ) Notice: Subject to any disclaimer, the term of this patent is extended or adjusted under 35 U.S.C. 154(b) by 536 days.

(21) Appl. No.: 15/156,011

(22) Filed: May 16, 2016

(65) Prior Publication Data
US 2016/0335257 A1 Nov. 17, 2016

Related U.S. Application Data

(60) Provisional application No. 62/161,528, filed on May 14, 2015.

(51) Int. Cl.
*G06F 16/38* (2019.01)
*G06F 16/93* (2019.01)
(Continued)

(52) U.S. Cl.
CPC .......... *G06F 16/382* (2019.01); *G06F 16/248* (2019.01); *G06F 16/2457* (2019.01);
(Continued)

(58) Field of Classification Search
CPC ........ G06F 17/30011; G06F 17/30728; G06F 17/30864; G06F 17/3053; G06F 17/30554; G06F 2216/11; G06F 17/2235; G06F 17/30321; G06F 17/30424; G06F 17/30598; G06F 17/30696; G06F 17/30705; G06F 17/3071; G06F 17/30716; G06F 17/30964; G06F 16/93; G06F 16/382;
(Continued)

(56) References Cited

U.S. PATENT DOCUMENTS 6,038,574 A 3/2000 Pitkow et al.
6,286,018 B1 9/2001 Pitkow et al.
(Continued)

OTHER PUBLICATIONS

Eto, Masaki. "Evaluations of context-based co-citation searching." Scientometrics, 2013; 94:651-673.

*Primary Examiner* — Dennis Truong
(74) *Attorney, Agent, or Firm* — Emory University Patent Group

(57) ABSTRACT

Methods, systems and computer-readable storage media relate to automatically and efficiently determine a set of relevant document(s) relevant to an inputted set of document(s) based on at least indirect citations. The method may include determining a group of one or more citing documents from one or more citing documents for a queried set of one or more documents. The queried set may include the inputted set and/or one or more sets of relevant document(s). The method may also include determining a group of the one or more cited documents from the one or more citing documents for the group. The method may include determining relevance information for each cited document of the group. The method may further include determining a first set of one or more documents that are relevant to the inputted set of one or more documents based on the relevance information of the second group.

20 Claims, 10 Drawing Sheets

(51) Int. Cl.
*G06F 16/338* (2019.01)
*G06F 16/2457* (2019.01)
*G06F 17/22* (2006.01)
*G06F 16/248* (2019.01)
*G06Q 50/18* (2012.01)

(52) U.S. Cl.
CPC ............ *G06F 16/338* (2019.01); *G06F 16/93* (2019.01); *G06F 17/2235* (2013.01); *G06F 2216/11* (2013.01); *G06Q 50/18* (2013.01); *G06Q 50/184* (2013.01)

(58) Field of Classification Search
CPC ............ G06F 16/24578; G06F 16/951; G06F 16/248; G06F 16/285; G06F 16/35; G06F 16/338; G06F 16/958; Y10S 707/912; Y10S 707/923; Y10S 707/93; Y10S 707/933; Y10S 707/937; Y10S 707/942; Y10S 707/99937; G06Q 50/18; G06Q 50/184
USPC ......... 707/706, 738, 726, E17.097; 715/206; 705/310
See application file for complete search history.

(56) References Cited

U.S. PATENT DOCUMENTS

| | | | | |
|---|---|---|---|---|
| 6,289,342 B1 * | 9/2001 | Lawrence | ......... | G06F 17/30728 |
| 6,457,028 B1 * | 9/2002 | Pitkow | ................ | G06F 17/3061 |
| | | | | 707/999.005 |
| 7,028,039 B2 * | 4/2006 | Burrows | ................ | G06F 16/30 |
| | | | | 707/709 |
| 7,433,884 B2 * | 10/2008 | Breitzman | ............. | G06Q 30/02 |
| 7,689,546 B2 * | 3/2010 | Miller | ............... | G06F 17/30634 |
| | | | | 707/999.003 |
| 7,716,225 B1 * | 5/2010 | Dean | ................... | G06F 17/2235 |
| | | | | 707/748 |
| 8,612,411 B1 * | 12/2013 | Mittal | ................. | G06F 17/3071 |
| | | | | 707/706 |
| 8,805,814 B2 * | 8/2014 | Zijlstra | ................ | G06F 16/382 |
| | | | | 707/707 |
| 8,886,638 B2 * | 11/2014 | Zhang | ............... | G06F 16/24578 |
| | | | | 707/723 |
| 9,075,873 B2 * | 7/2015 | Vanderwende | ....... | G06F 16/382 |
| 9,367,604 B2 * | 6/2016 | Lu | ........................ | G06Q 10/10 |
| 9,443,022 B2 * | 9/2016 | Jeh | ...................... | G06F 16/9535 |
| 9,646,082 B2 * | 5/2017 | Al-Kofahi | .............. | G06Q 50/18 |
| 9,953,049 B1 * | 4/2018 | Hajaj | ..................... | G06F 16/23 |
| 10,095,778 B2 * | 10/2018 | Barney | ............ | G06F 16/24578 |
| 10,127,229 B2 * | 11/2018 | Schijvenaars | ........... | G06F 16/93 |
| 2002/0169770 A1 * | 11/2002 | Kim | ...................... | G06F 16/355 |
| 2003/0001873 A1 * | 1/2003 | Garfield | ................. | G06F 16/94 |
| | | | | 715/700 |
| 2006/0143197 A1 * | 6/2006 | Kaul | ...................... | G06F 16/951 |
| 2007/0073748 A1 * | 3/2007 | Barney | ............. | G06F 17/30675 |
| 2007/0208707 A1 * | 9/2007 | Okamoto | .......... | G06F 17/30011 |
| 2007/0219970 A1 * | 9/2007 | Dunie | ............... | G06F 17/30011 |
| 2008/0154848 A1 * | 6/2008 | Haslam | .................. | G06F 16/93 |
| 2008/0243799 A1 * | 10/2008 | Rozich | ............. | G06F 17/30864 |
| 2009/0112859 A1 * | 4/2009 | Dehlinger | ......... | G06F 17/30728 |
| 2009/0276724 A1 * | 11/2009 | Rosenthal | ......... | G06F 17/30696 |
| | | | | 715/771 |
| 2010/0174698 A1 * | 7/2010 | Odland | ................... | G06F 16/93 |
| | | | | 707/706 |
| 2010/0268708 A1 * | 10/2010 | Zhang | ............... | G06F 17/30663 |
| | | | | 707/726 |
| 2011/0179035 A1 * | 7/2011 | Zhang | .................. | G06F 16/382 |
| | | | | 707/739 |
| 2011/0270826 A1 * | 11/2011 | Cha | ........................ | G06F 16/93 |
| | | | | 707/723 |
| 2012/0011132 A1 * | 1/2012 | Spielthenner | ............. | G06F 7/24 |
| | | | | 707/750 |
| 2012/0054240 A1 * | 3/2012 | Zhang | ............... | G06F 17/30728 |
| | | | | 707/780 |
| 2013/0282735 A1 * | 10/2013 | Pedersen | ............. | G06Q 50/184 |
| | | | | 707/748 |
| 2014/0214825 A1 * | 7/2014 | Zhang | ............... | G06F 17/30867 |
| | | | | 707/732 |
| 2015/0006410 A1 * | 1/2015 | Ozluturk | ............... | G06Q 50/184 |
| | | | | 705/310 |
| 2015/0220609 A1 * | 8/2015 | Sood | ................. | G06F 16/24578 |
| | | | | 707/602 |
| 2015/0347557 A1 * | 12/2015 | Allen | ................. | G06F 17/30598 |
| | | | | 707/738 |
| 2016/0335257 A1 * | 11/2016 | Janssens | ............... | G06F 16/382 |

\* cited by examiner

METHODS, SYSTEMS AND COMPUTER READABLE STORAGE MEDIA FOR DETERMINING RELEVANT DOCUMENTS BASED ON CITATION INFORMATION

CROSS REFERENCE TO RELATED APPLICATIONS

This Application claims priority to U.S. Provisional Application No. 62/161,528 filed May 14, 2015. The entirety of this application is hereby incorporated by reference for all purposes.

BACKGROUND

A complete representation of all available relevant documents can be critical to a topic analysis, such as a systematic review or a meta-analysis. One way to find relevant documents is a keyword-based search. However, keyword-based searches often do not provide a complete representation of relevant documents because the terminology for key concepts, variables and outcomes often differ among documents. To provide a more complete representation, keyword-based searches are often complimented by manual screening of the citation information of retrieved documents. Many documents do not consistently cite related earlier work and therefore searching based on direct citations can be unreliable. Thus, determining relevant documents can be challenging and time consuming.

SUMMARY

Thus, there is a need for automatic and efficient systems, computer readable media and methods for determining one or more relevant documents based on citation information. The disclosure relates to systems, methods, and computer-readable media storing instructions for determining one or more relevant documents relevant to an inputted set of one or more documents based on indirect and/or direct citations.

In some embodiments, the methods may relate to a computer-implemented method to determine one or more documents relevant to an inputted set of one or more documents. In some embodiments, the method may include processing citation information for a queried set of one or more documents to determine a group of one or more citing documents for the queried set. The queried set of one or more documents may include the inputted set of one or more documents and/or the inputted set of one or more documents and one or more sets of one or more relevant documents (determined in previous processing cycles). The method may further include processing citation information for the group of one or more citing documents to determine a group of one or more cited documents for the group of one or more citing documents. The method may also include determining relevance information for each cited document of the group of one or more cited documents with respect to the group of one or more cited documents and/or the group of one or more citing documents. The method may further include determining a set of one or more relevant documents that are relevant to the inputted set of one or more documents based on the relevance information.

In some embodiments, the computer-readable media may relate to a non-transitory computer readable storage medium comprising program instructions stored thereon, wherein the program instructions are executable by a computer to cause the computer to determine one or more documents relevant to an inputted set of one or more documents by performing the following steps. In some embodiments, the steps may include processing citation information for a queried set of one or more documents to determine a group of one or more citing documents for the queried set. The queried set of one or more documents may include the inputted set of one or more documents and/or the inputted set of one or more documents and one or more sets of one or more relevant documents (determined in previous processing cycles). The steps may also include processing citation information for the group of one or more citing documents to determine a group of one or more cited documents for the group of one or more citing documents. The steps may further include determining relevance information for each cited document of the group of one or more cited documents with respect to the group of one or more cited documents and/or the group of one or more citing documents. The steps may also include determining a set of one or more relevant documents that are relevant to the inputted set of one or more documents based on the relevance information.

In some embodiments, the systems may relate to a system for determining one or more documents relevant to an inputted set of one or more documents. The system may include at least one processor; and a memory. The processor may be configured to cause processing citation information for a queried set of one or more documents to determine a group of one or more citing documents for the queried set. The queried set of one or more documents may include the inputted set of one or more documents and/or the inputted set of one or more documents and one or more sets of one or more relevant documents (determined in previous processing cycles). The processor may be configured to further cause processing citation information for the group of one or more citing documents to determine a group of one or more cited documents for the group of one or more citing documents. The processor may also be configured to cause determining relevance information for each cited document of the group of one or more cited documents with respect to the group of one or more cited documents and/or the group of one or more citing documents. The processor may be configured to cause determining a set of one or more relevant documents that are relevant to the inputted set of one or more documents based on the relevance information.

Additional advantages of the disclosure will be set forth in part in the description which follows, and in part will be obvious from the description, or may be learned by practice of the disclosure. The advantages of the disclosure will be realized and attained by means of the elements and combinations particularly pointed out in the appended claims. It is to be understood that both the foregoing general description and the following detailed description are exemplary and explanatory only and are not restrictive of the disclosure, as claimed.

BRIEF DESCRIPTION OF THE DRAWINGS

The disclosure can be better understood with the reference to the following drawings and description. The components in the figures are not necessarily to scale, emphasis being placed upon illustrating the principles of the disclosure.

DESCRIPTION OF THE EMBODIMENTS

Figure 1:
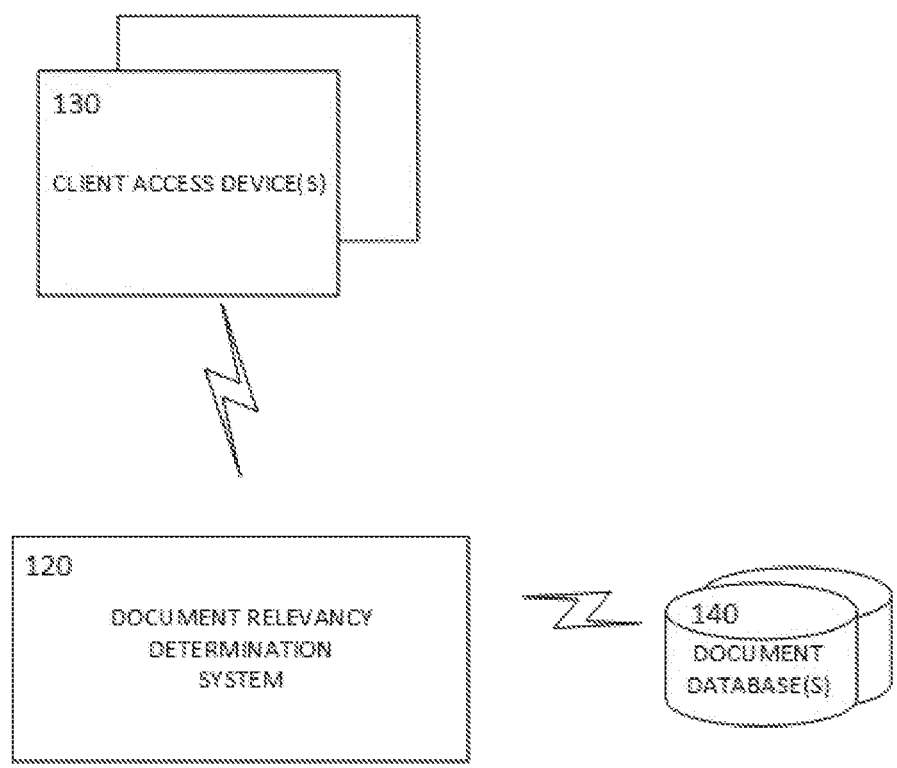
FIG. 1 shows a block diagram illustrating a system according to embodiments.

In the following description, numerous specific details are set forth such as examples of specific components, devices, methods, etc., in order to provide a thorough understanding of embodiments of the disclosure. It will be apparent, however, to one skilled in the art that these specific details need not be employed to practice embodiments of the disclosure. In other instances, well-known materials or methods have not been described in detail in order to avoid unnecessarily obscuring embodiments of the disclosure. While the disclosure is susceptible to various modifications and alternative forms, specific embodiments thereof are shown by way of example in the drawings and will herein be described in detail. It should be understood, however, that there is no intent to limit the disclosure to the particular forms disclosed, but on the contrary, the disclosure is to cover all modifications, equivalents, and alternatives falling within the spirit and scope of the disclosure.

The disclosed methods, systems, and computer readable media automatically and efficiently determine a set of one or more relevant documents that are at least citationally relevant with respect to an inputted set of one or more documents. Citations often capture important information about the relationships between documents. The disclosed methods, systems and computer-readable media can determine relevant document results based on indirect citation relevancy in addition to direct citation relevancy. This can address the deficiencies associated with direct citations and/or documents that are not related in a single citation network in which documents consistently cite/refer to earlier documents.

As described herein, the terms "document" and "article" shall be understood to be a self-contained written, printed and/or electronic work. For example, a document may include but is not limited to an article, patent application, issued patent, grant proposal, periodical, agreement, legal document, appellate case, book, chapter, thesis, periodical, treatise, other publication or document, or a combination thereof.

As described herein, an inputted set of one or more documents shall be understood to be a set of one or more documents that are the focus of the determination/search for relevant documents. For example, the inputted set of one or more documents may be the set of one or more documents inputted by a user and/or determined by the system to be relevant to a topic inputted by a user. Additionally, a queried set of one or more documents shall be understood to be a set of one or more documents that are processed to determine one or more relevant documents relevant to the inputted set. In some embodiments, the queried set of one or more documents may include the inputted set and/or the inputted set and set(s) of one or more relevant documents determined to be relevant to the inputted set by the disclosed methods, systems, and computer-readable media (e.g., in previously processing cycle(s)).

In some embodiments, the system determines a set of one or more documents that are relevant with respect to an inputted set of one or more documents based on relevance information associated with indirect and/or direct citations. In some embodiments, the relevance information may be determined from citation information associated with the document(s). The citation information may include citations as included in or referred to by each document of the queried/inputted set of one or more documents. The citation information for each document may include (i) cited document(s) and (ii) citing document(s). By way of example, the cited document(s) for a specific document may include any document cited by the specific document. For example, a cited document may be a document that the specific document relied on, considered and/or referenced (e.g., in-text citations, footnotes, endnotes, etc.) The citing document(s) for a specific document may include any document that cited the specific document. A citation can identify a document as a source of information or reference to an authority. For example, the respective bibliographic or other reference data for each cited and/or citing document can include the following information: full title, author name(s), publication data, including journal and/or publisher, volume, edition and other data, and date and location of publication. By way of example, the respective bibliographic or other reference data for a document, e.g., a scientific article, may include authors, title, journal name, volume, issue, page numbers and date.

The relevance information for a document may be one or more measures of the document's citation relevance with respect to the queried/inputted set of one or more documents. In some embodiments, the relevance information may relate to co-citation and/or citation strength. In some embodiments, the relevance information may include a first relevance score or index representing a frequency of co-citation and/or citation of each document within a group of one or more documents and a second relevance score or index (also referred to as a "J index") representing relevance of each document of the group of one or more documents with respect to another group of one or more documents that cites to or is cited by the group of one or more documents. For example, the other group of one or more documents may refer to the group of citing and/or cited documents directly citing to and/or cited by the queried/inputted set. In this example, the second relevance score or index for a document may correspond to the frequency of co-citation divided by the number of citing documents that cite that document. In this way, the relevant documents may be determined from both direct and/or indirect citations.

FIG. 1 is a block diagram of a configuration of the hardware and software components according to some embodiments. The system 100 may include any number of systems and/or devices that communicate with other through electrical or data connections (not shown). In some embodiments, the systems and/or devices may be connected via a wired network, wireless network, or combination thereof. In some embodiments, the networks may be encrypted. In some embodiments, the wired network may be, but is not limited to, a local area network, such as Ethernet, or wide area network. In some embodiments, the wireless network may be, but is not limited to, any one of a wireless wide area network, a wireless local area network, a Bluetooth network, a radio frequency network, or another similarly functioning wireless network. In some embodiments, any of the systems and/or devices of the system 100 may be at least in part be based on cloud computing architecture. In some embodiments, the systems and/or devices may be applied to a self-hosted private cloud based architecture, a dedicated public cloud, a partner-hosted private cloud, as well as any cloud based computing architecture.

Although the systems/devices of the system 100 are shown as being directly connected, the systems/devices may be indirectly connected to one or more of the other systems/devices of the system 100. In some embodiments, a system/device may be only directly connected to one or more of the other systems/devices of the system 100.

It is also to be understood that the system 100 may omit any of the systems and/or devices illustrated and/or may include additional systems and/or devices not shown. It is also to be understood that more than one device and/or system may be part of the system 100 although one of each device and/or system is illustrated in the system 100. It is further to be understood that each of the plurality of devices and/or systems may be different or may be the same.

With reference to FIG. 1, the system 100 may include a document relevance determination system 120, a client access device 130, and one or more databases 140. In some embodiments, the document relevance determination system 120 may be a server.

The system 120 may be configured to include and/or interface with the one or more databases 140. The one or more databases 140 may include document resource databases relied on by users, such as researchers, students, doctors, lawyers, and other professionals. In some embodiments, the one or more databases 140 may include one or more databases configured to provide legal, research, financial, scientific, or health-care information. For example, the one or more databases may include databases, such as, Web of Science, Web of Knowledge, Scopus, Google Scholar, Science Open, PubMed, CrossRef, BIOSIS, Dialog, library OPACS, Medline, ProQuest, Ovid, Ebsco, WilsonWeb, ResearchGate, journal-configured external database, patent-configured external database, among others. The one or more databases 140 may include database(s) that are proprietary, subscription-based, or internal to a service provider, such as the Thomson Reuters Corporation. In some embodiments, the one or more databases 140 may include one or more of the following: one or more documents (e.g., a set of full-text files) and information about the documents (e.g., a meta-data) for instance, citation information, abstracts, links, classification data, and other source data associated with the documents provided in the databases.

The one or more databases 140 can be coupled or couplable via a wireless or wireline communications network, such as a local-, wide-, private-, or virtual-private network, to the system 120. Moreover, although shown as separate components in FIG. 1, the one or more databases 140 and the system 120 and/or the device 130 may be combined. For example, device 120 may include one or more databases in addition to or instead of the one or more databases 140. The one or more databases 140 may also be distributed over multiple databases and/or devices.

In some embodiments, the client access device 130 can generally include any node on a network including computational capability and including a mechanism for communicating across the network. The client access device 130 can be any type of client, including any type of computer (e.g., desktop computer, workstation, notebook, mainframe, terminal, etc.), handheld device (tablet, cellular phone, etc.), or the like.

During operation, a user can use the client access device 130 to communicate with the system 120 to determine one or more documents relevant to the inputted set of one or more documents. In some embodiments, the inputted set of one or more documents may be received as a query. A "search query" or "query" or "user-input query" refers to the inputted set of one or more documents and/or single sentence or sentences, a sentence fragment or sentence fragments or list of words and/or word groups relating to the inputted set of one or more documents that are the focus of the search for relevant documents. For example, a query may refer to an inputted set of one or more documents for which relevant documents are to be determined. By way of another example, a user can search for documents relevant to a certain disease. The system 120 may use one or more known documents that are key documents (e.g., scientific articles) for that disease as the basis of the search (i.e., as inputted set of one or more documents).

In response to a query, the system 120 may determine one or more relevant documents relevant to the inputted set based on indirect and/or direct citations associated with a queried/inputted set. In some embodiments, the indirect citation(s) for a document may relate to one or more documents that are not directly cited by or citing to that document (e.g., the queried/inputted document). In some embodiments, the direct citation(s) may relate to one or more documents that are directly cited by or citing that document (e.g., queried/inputted document).

In some embodiments, the system 120 may retrieve the citation information for the queried/inputted set of one or more documents from the database(s) 140. The system 120 may group the one or more citing and/or cited documents included in the citation information for determination of relevance information. In some embodiments, the user may specify predefined criteria that can act as inclusion criteria for the citing document(s) and/or cited document(s) included in the citation information to be considered part of the group of one or more citing and/or cited documents. The predefined criteria may include but are not limited to publication language, publication date, publication type (e.g., select journal articles only, original research articles only, etc.), data provided in the document, among others. In some embodiments, the system 120 can filter the documents included in the citation information based on the inclusion criteria. For example, if the predefined criteria exclude any document that is a correspondence, a commentary, or an editorial, the system 120 removes those documents from the group(s) of citing and/or cited document(s) for further processing. In this way, the one or more relevant documents may be determined more efficiently by the system 120.

Figure 4:
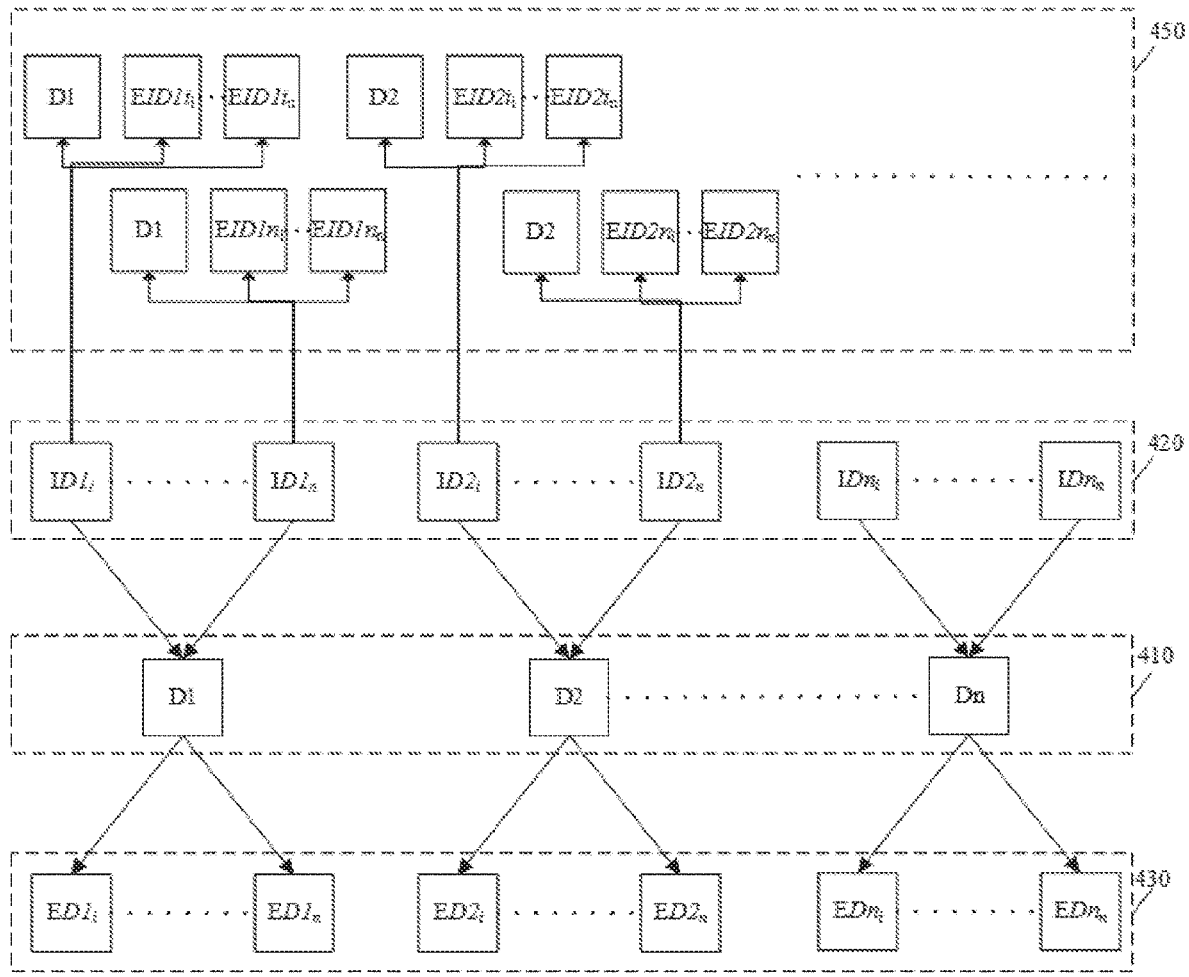
FIG. 4 shows an example of citation information for one or more documents.

FIG. 4 shows an example of a citation information 400 for a queried/inputted set of one or more documents 410. As shown in FIG. 4, the citation information for the queried/inputted set of one or more documents 410 may include one or more citing documents 420 and one or more cited documents 430. The documents 420 and 430 can be considered to be direct citations for documents 410. For example, the citation information for queried document D1 may include citing documents (ID1i . . . ) and cited documents (ED1i . . . ) and for queried document D2 may include citing documents (1D2i . . . ) and cited documents (ED2i . . . ). The one or more cited documents 450 for the one or more citing documents 420 may be considered indirect citation(s) for the one or more queried/inputted documents 410. However, it will be understood that citation information for a document may not include citing document(s) and/or cited document(s).

In some embodiments, the system 120 may perform one or more processing cycles to determine one or more sets of one or more relevant documents relevant to the inputted/queried set of documents. Each processing cycle may relate to steps (see FIG. 3A) that determine a set of one or more relevant documents based on indirect or direct citations for the inputted/queried set of documents. The system 120 may perform the processing cycles in any order. In some embodiments, the system 120 may repeat the processing cycle based on indirect and/or direct citations a number of times. In some embodiments, the system 120 may determine the processing cycle (i.e., determining a set of one or more relevant documents based on indirect citations or direct citations) and/or order of the processing cycles to determine one or more sets of one or more relevant documents that are relevant to the inputted set based on a number of factors. In some embodiments, the number of factors may include a number of inputted documents, relevant documents determined in a processing cycle (e.g., number of relevant documents determined based on indirect citations), age (e.g., publication date) of the inputted and/or relevant documents, among others, or a combination thereof. In this way, the likelihood that the system 120 determines all relevant documents citationally relevant to the inputted set can be increased.

For example, for a processing cycle based on indirect citations, the system 120 may determine a set of one or more relevant documents based on relevance information determined from the citation information of the one or more citing documents that cite the one or more queried documents. The system 120 may determine the relevance information from the documents that are cited by the citing documents. In some embodiments, the system 120 may determine a set of one or more relevant documents based on the relevance information. In some embodiments, the system 120 may rank the cited documents based on the relevance information. In some embodiments, the system 120 may determine one or more relevant documents from the documents if the relevance information meets certain criteria/threshold. The criteria may include a minimum first relevance score and/or second relevance score and/or other inclusion criteria (publication date, publication language, and the like). By determining the relevant documents based on indirect citations, the system 120 can therefore consider documents that are published before and/or after the publication of the one or more queried documents and can therefore find more relevant documents than relying solely on direct citations.

For example, for a processing cycle based on direct citations, the system 120 may determine a set of one or more relevant documents relevant to the inputted documents based on relevance information determined for the citing and/or cited documents of the inputted/queried documents. In some embodiments, the system 120 may rank the cited and/or citing documents based on the relevance information (e.g., on a descending first relevance score). In some embodiments, the system 120 may determine one or more relevant documents from the cited and/or citing documents if the relevance information meets certain criteria/threshold. The criteria may include a minimum first relevance score.

In some embodiments, the system 120 may also determine additional information associated with the one or more relevant documents that meet relevance score threshold. By way of example, the system 120 may determine frequency of authorship for each author of the one or more relevant documents. By way of example, the frequency of authorship may identify key researchers on a specific topic.

In one manner of implementation, the relevant document results determined by the system 120 may be delivered for presentation to a user. For example, the one or more relevant document results may include a listing of the one or more relevant documents, corresponding relevance information, a ranking of the one or more relevant documents based on relevance information, relevance score(s), citation count (e.g., frequency of citation by other documents), frequency of authorship (e.g., authorship count), other metrics/characteristics, other detail(s), among others, or a combination thereof. In some embodiments, the relevant document results may be presented on the system 120 as a report. In some embodiments, the report and/or the relevant document results may include a list of document summaries (e.g., authors, title, journal and other bibliographic information) with hyperlinks to the abstracts or full-text documents for each relevant document. In some embodiments, the report may further include image thumbnails. In some embodiments, the one or more documents may be provided in the list according to its rank based on the relevance information.

By way of example, a user (e.g., a researcher, librarian, funding agency, health agency, journalist, editor, etc.) can use the system 120 to determine relevant document results on a topic, for example, by inputting one or more document(s) (e.g., articles). For example, a user (e.g., researcher, librarian, health agency, funding agency, etc.) can use the system 120 to determine all relevant documents on a topic, for example, for an exhaustive search, systematic reviews, meta-analyses, among others, or any combination thereof. In another example, a user (e.g., researcher) can use the system 120 to determine one or more relevant documents, for example, for a best evidence search, a screening of top-ranked documents, among others, or any combination thereof. In a further example, a user (e.g., a researcher) can use the system 120 to determine one or more relevant documents that are considered to be "key" papers on a certain topic, for example, based on relevance score(s). In an additional example, a user (e.g., a researcher) can determine whether a certain document is a key paper on the topic based on the relevance score(s). In another example, a user (e.g., journal editor, journalists, funding agencies, media, etc.) can use the system 120 to determine a ranking of one or more relevant documents based on authorship frequency to find experts, reviewer(s), etc., for grants, articles, etc., among others.

Figure 2:
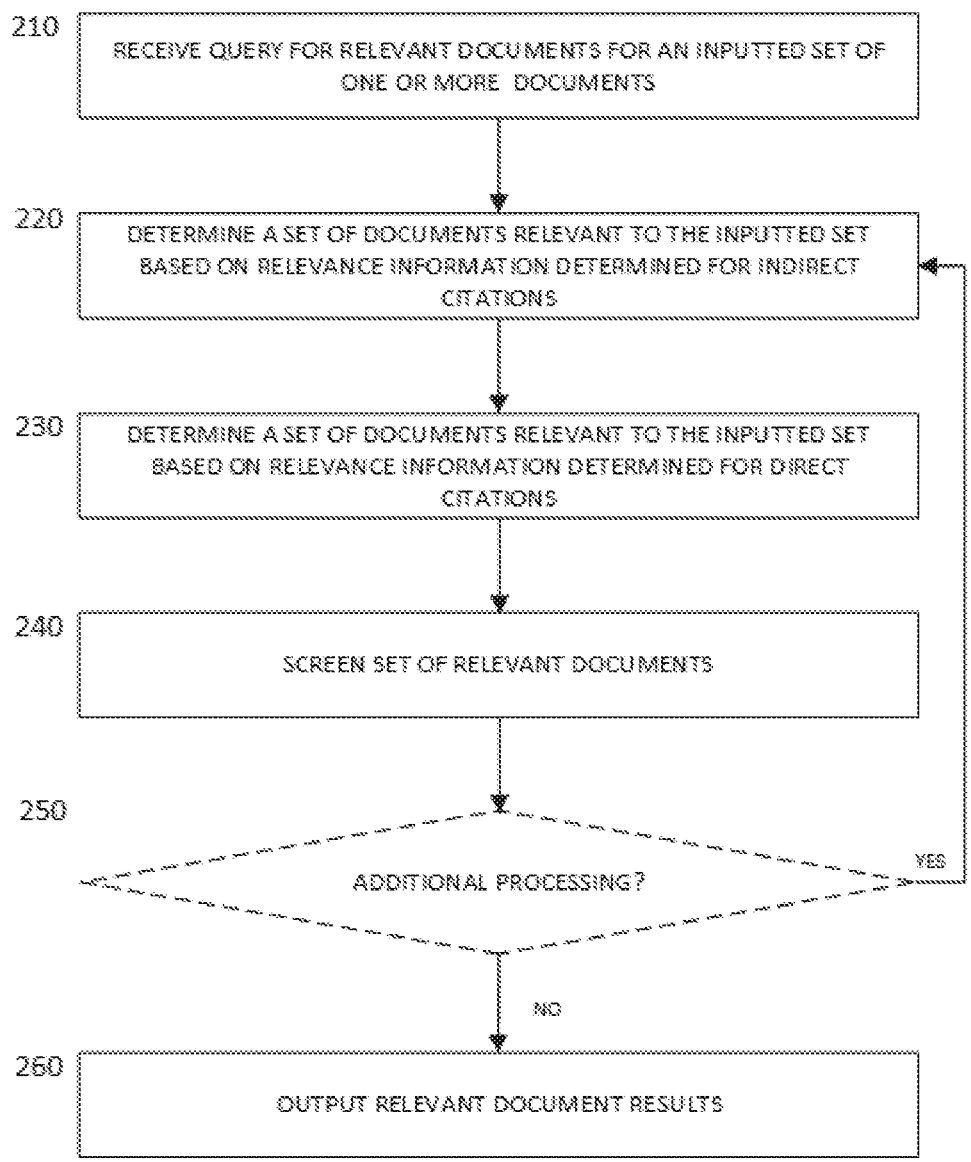
FIG. 2 shows a method of determining one or more relevant documents according to embodiments.

FIG. 2 illustrates a method 200 for determining a set of one or more documents that are at least citationally relevant with respect to an inputted set of one or more documents based on relevance information according to embodiments. In some embodiments, the method 200 may begin when a user submits a query for relevant documents for an inputted set of one or more documents. For example, the user may provide two documents (D1 and D2) for the system to determine one or more relevant documents.

In some embodiments, the method 200 may include a step 210 for receiving a query for relevant documents for an inputted set of one or more documents. The method 200 may include a step 220 of determining a set of one or more documents relevant to the inputted set based on indirect citations associated with the inputted/queried set and/or a step 230 of determining a set of one or more documents relevant to the inputted set based on direct citations associated with the inputted/queried set.

The steps 220 and 230 each refer to a single processing cycle. It will be understood that the method 200 is not limited to the order of steps shown and described with respect to FIG. 2. In some embodiments, the steps 220 and 230 may be performed in order, reverse order, repeated individually or sequentially, omitted, or any combination thereof. For example, the inputted set may be processed first by the step 220 and then by the step 230, as shown; or in reverse order, and optionally repeated in that order a number of times. In other embodiments, the steps 220 and/or 230 may be individually repeated a number of times before proceeding to the other step. The steps 220 and 230 are discussed with respect to a queried set of one or more documents because the document(s) processed in steps 220 and/or 230 may refer to inputted set of documents and/or the set(s) of one or more relevant documents relevant to the inputted set determined according to steps 220 and/or 230 in a previous processing cycle.

Figure 3A:
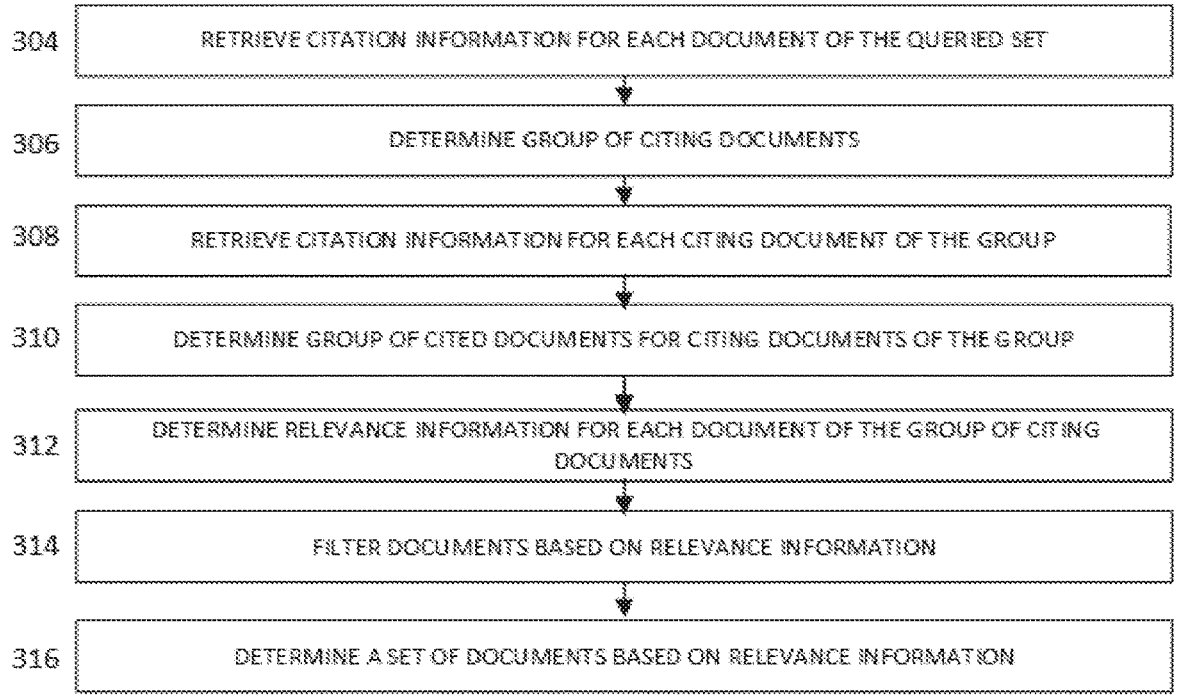
FIGS. 3A and 3B show methods of determining one or more relevant documents based on citation information according to embodiments.

In some embodiments, the step 220 of processing the citation information of the queried set to determine relevance information from the cited documents that are cited by the citing documents of the queried set. The set of one or more relevant documents may be determined based on the relevance information. In some embodiments, the step 220 may include determining a set of one or more relevant documents based on relevance information for each cited document in each citing document of the inputted/queried set. FIG. 3A (described below) shows a method 300 of determining a set of one or more relevant documents relevant to the inputted/queried set based on relevance information associated with indirect citation(s) of the inputted/queried set.

Figure 3B:
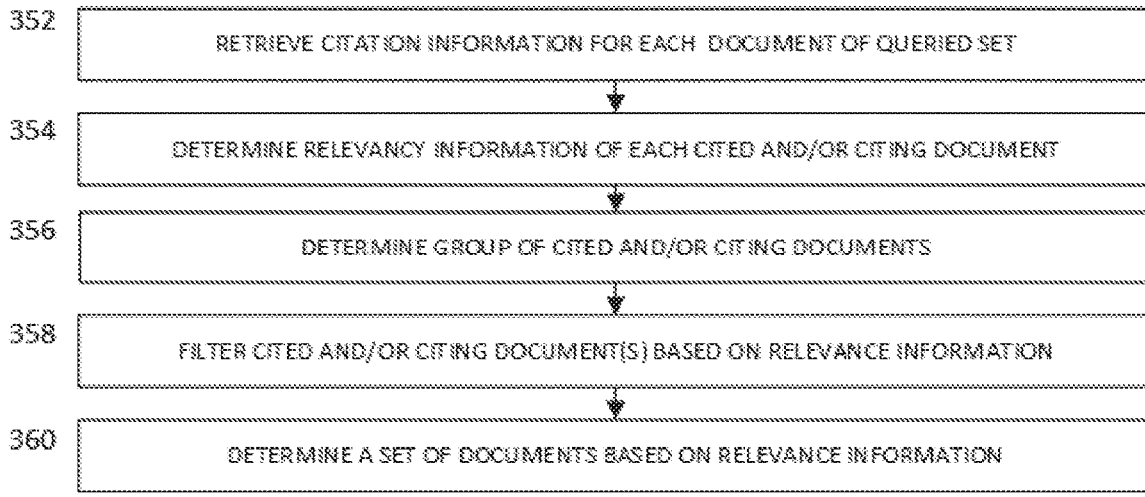

In some embodiments, the step 230 of processing the citation information of the inputted/queried set to determine relevance information from the cited documents and/or citing documents of the inputted/queried set. The set of one or more relevant documents may be determined based on the relevance information. In some embodiments, the step 230 may include determining a set of one or more relevant documents based on relevance information for each cited/citing document of the inputted/queried set. FIG. 3B shows a method 350 for processing the queried set of one or more documents to determine a set of one or more relevant documents based on direct citation(s) of the queried set.

In some embodiments, the method 200 may include a step 240 of screening the set of one or more documents. The screening may include but is not limited to a computer-automated screening based on semantic analysis of the entire/partial content of the document. For example, the screening may include screening and/or ranking the documents for the occurrence of specific (e.g., relevant/inputted) keyword(s) and/or heir synonyms, for example, that reflect the topic of interest.

In some embodiments, the method 200 may include a step 250 of determining whether additional processing cycles are necessary to determine one or more relevant documents relevant to the inputted set. In some embodiments, the step 250 may include comparing the set of one or more relevant documents determined in steps 220 and/or 230 to the set of one or more queried documents processed in the initial processing cycle (excluding the inputted set) to determine whether additional processing cycles may be needed to determine additional relevant documents. For example, assuming that the queried set is processed by steps 220 and 230 in the order shown in FIG. 2, the step 250 may include comparing the set of one or more relevant documents determined in steps 220 and 230 to the queried set of documents (excluding the inputted document(s)) initially processed in step 220 to determine whether they match.

If the method 200 determines that the steps 220 and 230 did not determine additional relevant documents (NO at step 250), then the method 200 can proceed to outputting the results. If no more relevant documents are determined by the method 200, then there is a strong likelihood that all relevant documents may have been determined by the system 120 (e.g., that at least all documents that can be found through the databases have been identified). On the other hand, if the method 200 determines that steps 220 and 230 determined additional relevant documents to the initial queried documents (YES at step 250), then the method 200 may repeat steps 220 and 230 until no additional relevant documents are determined by the method 200. In this example, the method 200 may add the document(s) of the set(s) of relevant documents determined in the previous processing cycles to the queried set for processing according to steps 220 and/or 230.

In some embodiments, the step 250 may include comparing the set of one or more relevant documents determined in steps 220 and/or 230 to a number of predefined factors to determine whether the set of one or more relevant documents meets the factors. For example, the factors may include but is not limited to number of the relevant documents, age of the relevant documents, among others, or a combination thereof.

In some embodiments, the method 200 may include a step 260 of outputting the relevant document results (e.g., one or more sets of one or more relevant documents, relevance document report, rank, among others, or a combination thereof). For example, the one or more relevant documents relevant to the inputted set of documents can correspond to the set(s) of one or more documents determined in each processing cycle. For example, the set(s) of one or more relevant documents determined in each processing cycle (e.g., steps 220 and/or 230) may be combined and outputted. In some embodiments, the outputting step 260 may include displaying, printing, storing, and/or transmitting the one or more relevant documents, relevance information, or a combination thereof. In some embodiments, the one or more relevant documents may be outputted with a ranking based on the relevance information. In some embodiments, a relevance document report may be outputted with the one or more relevant documents, associated relevant information, ranking, number of documents analyzed, among others, or a combination thereof. In some embodiments, the results may be transmitted to another system, application, and/or stored for further analysis (e.g., for documenting the search procedure in a meta-analysis or systematic review).

It will be understood that some of the steps of 200 may be repeated and/or omitted. For example, in some embodiments, the method 200 may omit any of steps 230, 240 or 250, and proceed to step 260 of outputting the relevant document results (e.g., a report).

FIG. 3A shows a method 300 of determining one or more relevant documents relevant to the inputted set based on indirect citation(s) of the queried set. As discussed above, the queried set may include the inputted set and/or the inputted set and set(s) of one or more relevant documents relevant to the inputted set determined in previous processing cycles.

In some embodiments, the method 300 may include a step 304 for retrieving citation information for each document of the queried set. In some embodiments, the citation information for the queried set of documents may be retrieved from the one or more databases 140. In some embodiments, the step 304 may include retrieving the citing documents and/or cited documents for each document of the queried set. In the example shown in FIG. 4, the documents 420 correspond to a group of citing documents for the queried set of documents 410.

In some embodiments, the method 300 may include a step 306 for determining a group of one or more citing documents. In some embodiments, the step 306 may include filtering the one or more citing documents to remove any duplicates of the citing documents so that there is only one instance of a citing document included in the group. In some embodiments, the step 306 may further include filtering the one or more citing documents based on inclusion criteria (e.g., publication date, publication language, publication type, etc.).

Next, the method 300 may include a step 308 of retrieving citation information for each citing document of the group of one or more citing documents. Like step 304, the step 308 may include retrieving the citing documents and/or cited documents for each document of the group of citing documents, for example, from one or more databases 140. In some embodiments, the step 308 may include retrieving only the cited documents for each document of the group of one or more citing documents.

In the example shown in FIG. 4, the documents 450 correspond to the cited documents for each document of the citing documents 420. As shown in FIG. 4, the one or more queried documents 410 are included in the cited documents 450.

In some embodiments, the method 300 may include a step 310 for determining a group of one or more cited documents based on the one or more cited documents cited by each citing document included in the group of the one or more citing documents. In some embodiments, the step 310 may include filtering the one or more cited documents based on inclusion criteria (e.g., publication date, publication language, publication type, etc.).

In some embodiments, the method 300 may include a step 312 for determining relevance information for each cited document of the group. For example, the step 312 may include determining a first relevance score representing a frequency of citation of each document in the group of the cited documents and/or a second relevance score representing relevance of each document of the group of the cited documents with respect to the group of citing documents. In some embodiments, the first relevance score for a document included in the group of the cited documents may correspond to the frequency that the document is included in that group. The first relevance score may therefore correspond to a co-citation strength. The second relevance score for a document included in the group of the cited documents may correspond to the first relevance score divided by the number of documents included in the group of the citing documents. The second relevance score may therefore correspond to a percentage.

For example, in FIG. 4, the first relevance score may be determined by counting the number of instances of a document is included in the cited documents 450 and the second relevance score may be determined by dividing the first relevance score by the number of citing documents included in the documents 420. In this way, documents that are relevant to the queried documents may be determined based on the frequency of indirect citations.

In some embodiments, the method 300 may include a step 314 of filtering the documents included in the group of cited documents by comparing the relevance information to a relevance threshold. The first relevance score and/or the second relevance score may be compared to a respective relevance threshold. For example, if there are many cited documents included in the group, the cited documents can be more efficiently analyzed and filtered by including a second relevance score. By way of example, the relevance threshold for the first relevance score may correspond to one or greater and the relevance threshold for the second relevance score may correspond to 1% or greater. The maximum first frequency score may correspond to the number of citing documents (e.g., the number of documents included in the queried group of citing documents). In some embodiments, the step 314 may include ranking the one or more documents based on the first relevance score and/or the second relevance score. In some embodiments, the method 300 may include a step 316 of determining one or more relevant documents from the filtered documents. For example, the cited document(s) that have relevance information that meets and/or exceeds the relevance threshold may be considered to be a (first) set of one or more documents that are relevant to the inputted set of one or more documents. In another example, the cited document(s) having a certain ranking (e.g., above a relevance ranking) may be considered to be a (first) set of one or more documents that are relevant to the inputted/queried set of one or more documents.

In some embodiments, the inputted/queried set of documents may be processed according to the method 350 shown in FIG. 3B to determine a set of one or more relevant documents based on direct citation(s). In some embodiments, the relevant documents may be determined based on relevance information determined for the citing and/or cited documents. In some embodiments, the relevant documents may be determined from both the citing and cited documents. In some embodiments, the relevant documents may be determined based on the relevance information for the combined group of citing and cited documents. In further embodiments, the relevant documents may be determined based on the relevance information for each group of citing and cited documents. For example, the method 350 may be performed using the one or more cited documents for the queried/inputted set and then repeated for the one or more citing documents for the queried/inputted set, or vice versa. It will also be understood that the reliance of citing and/or cited documents may be based on the age (e.g., publication date of the documents). For example, recently published documents may not have yet been cited.

In some embodiments, the method 350 may include a step 352 of retrieving the citation information for each document of the queried set. The step 352 may include retrieving the citing documents and/or cited documents for each document of the queried set, for example, from one or more databases 140. In some embodiments, both the citing documents and cited documents may be retrieved.

In some embodiments, the method 350 may include a step 354 for determining a group of one or more citing and/or cited documents. The group may include a combination of the cited and citing documents. In some embodiments, the group may include the cited or citing documents. In some embodiments, the step 354 may include filtering the one or more citing and/or cited documents based on inclusion criteria (e.g., publication date, publication language, publication type, etc.).

Next, the method 350 may include a step 356 of determining relevance information for each document based on the group of cited and/or citing documents. The relevance information may include a first relevance score. The first relevance score for each document of the group may correspond to the frequency that the document is included in the group. The first relevance score may therefore correspond to a citation strength.

Next, the method 300 may include a step 358 of filtering the documents included in the group based on a relevance threshold by comparing the relevance information to a relevance threshold. The first relevance score may be compared to a respective relevance threshold. By way of example, the relevance threshold for the first relevance score may correspond to one or more. The maximum first frequency score may correspond to the number of the documents in the queried set. In some embodiments, the step 358 may include ranking the one or more documents based on the first relevance score.

In some embodiments, the method 350 may include a step 360 of determining a set of one or more relevant documents from the filtered documents. For example, the citing and/or cited document(s) that have relevance information that meets and/or exceeds the relevance threshold may be considered to be a relevant document. In some embodiments, the cited and/or citing document(s) having a certain ranking (e.g., above a relevance ranking) may be considered to be a relevant document.

Figure 5A:
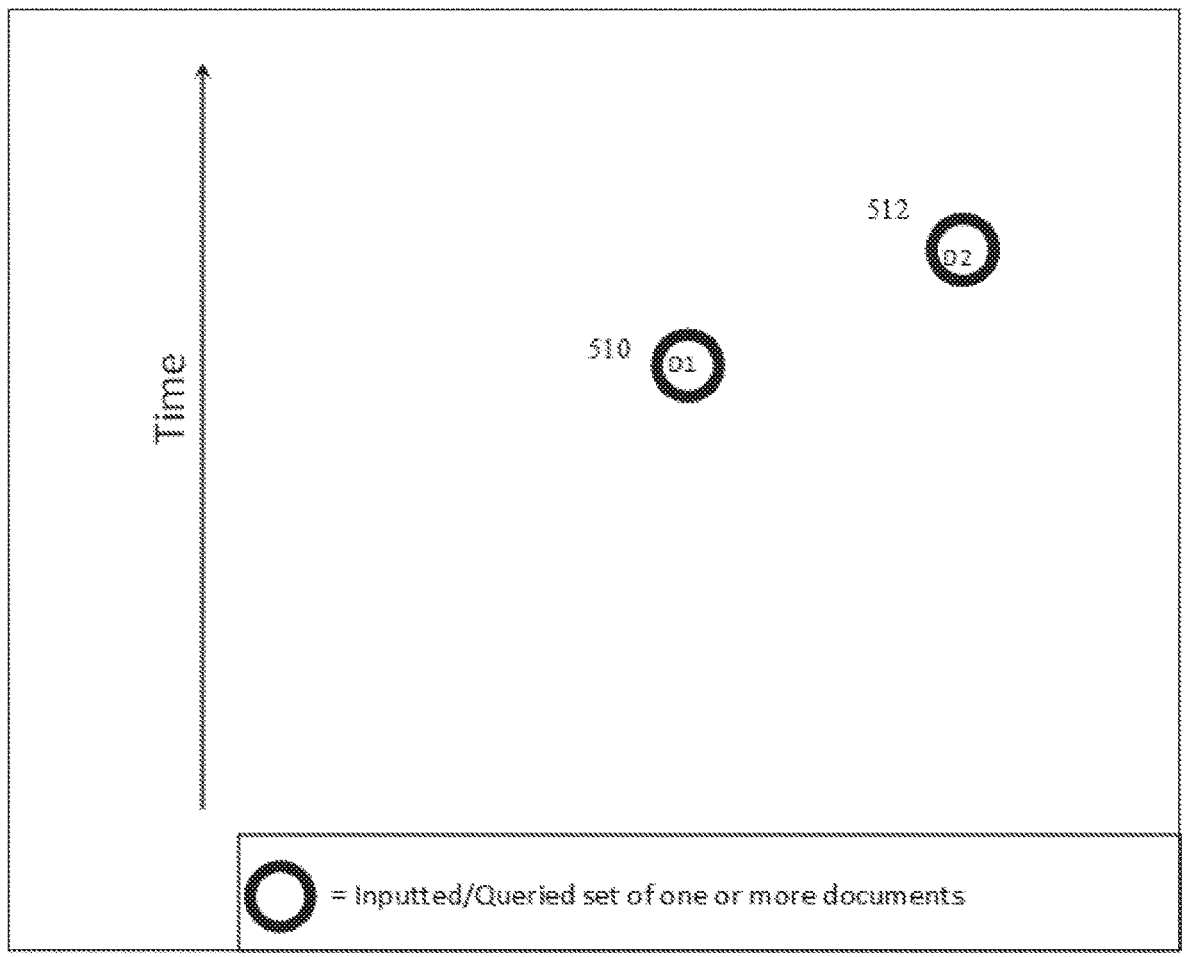
FIGS. 5A-E show an illustrative example of determining relevant information for one or more documents according to embodiments.
Figure 5B:
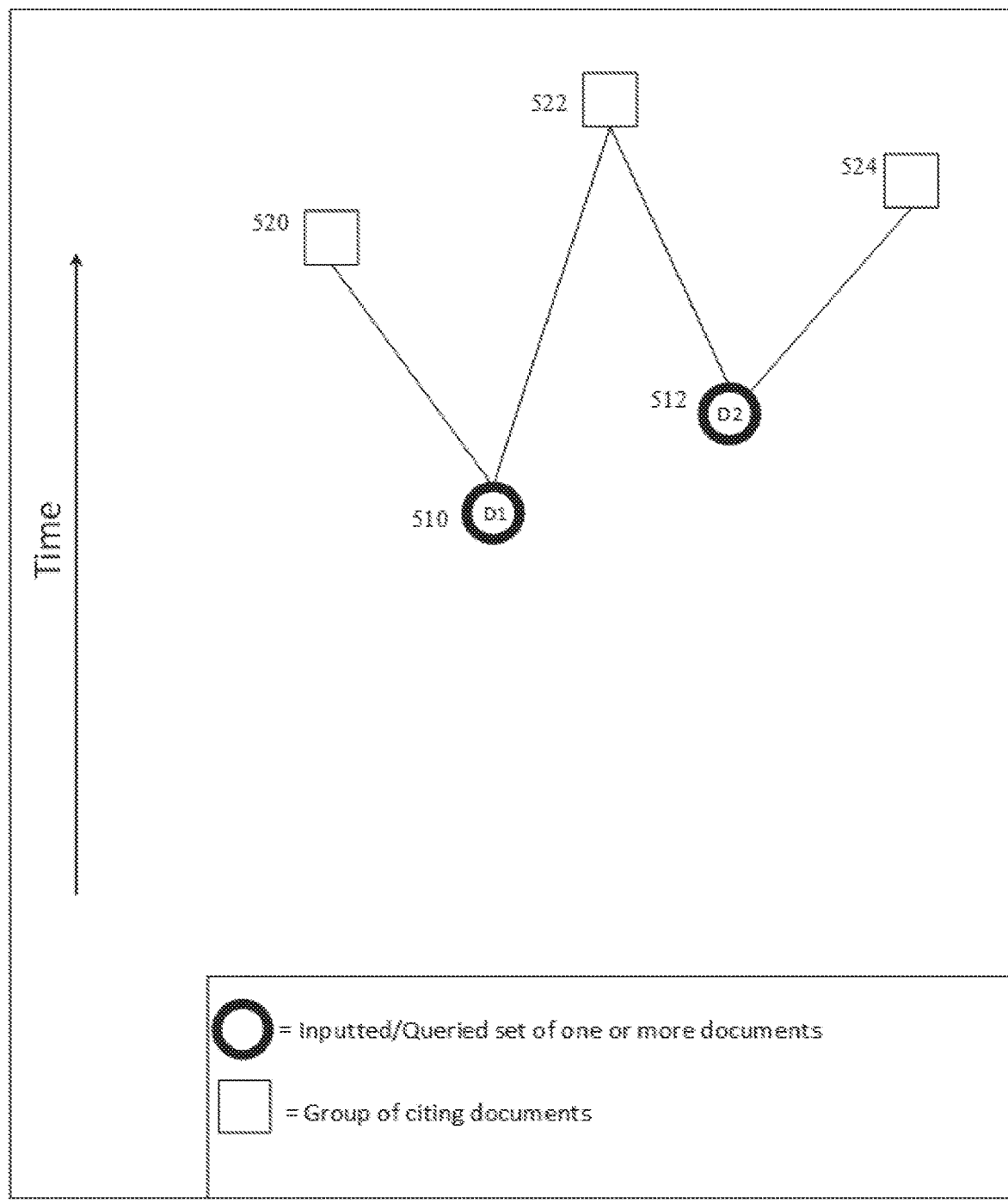
Figure 5C:
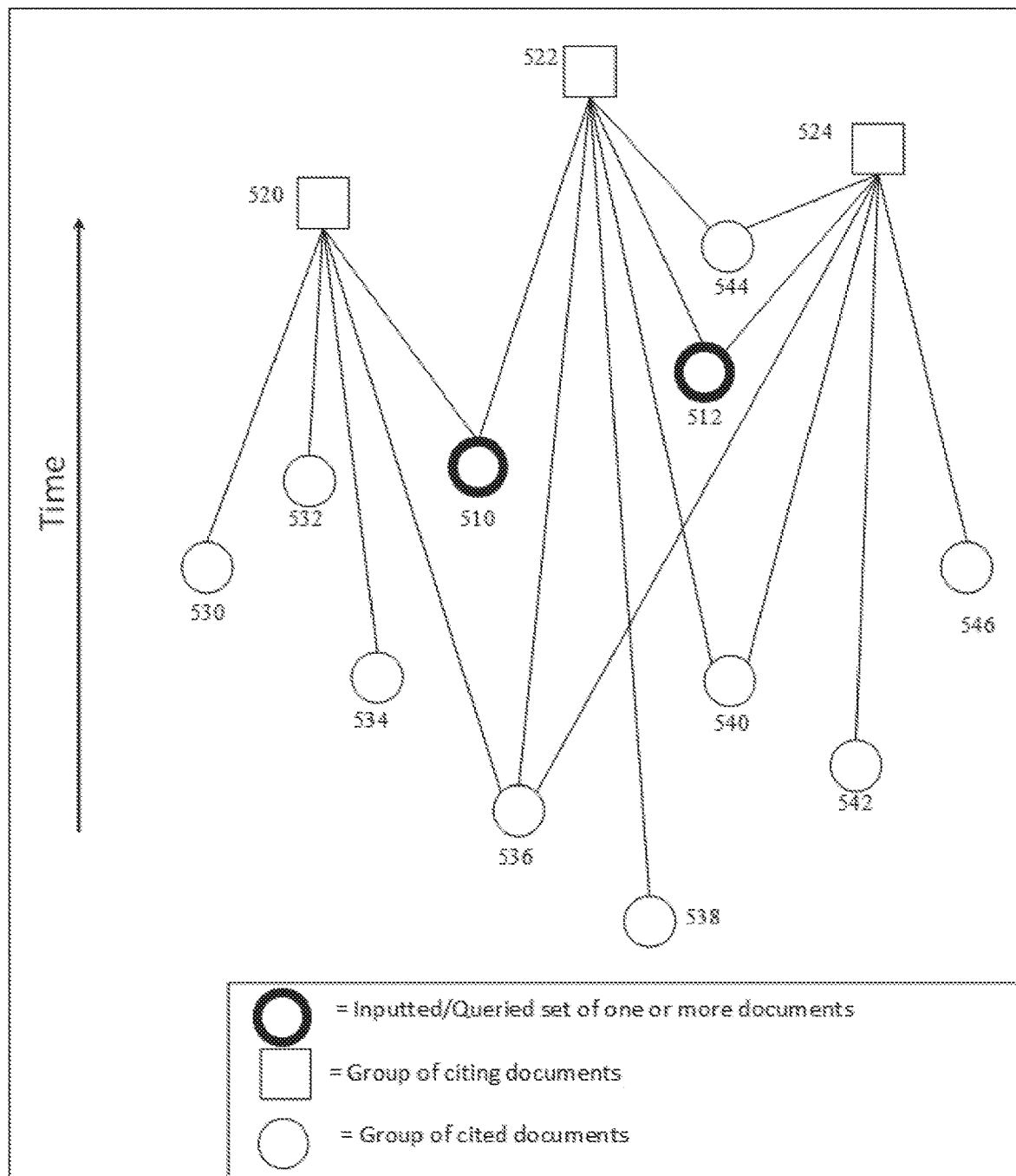
Figure 5D:
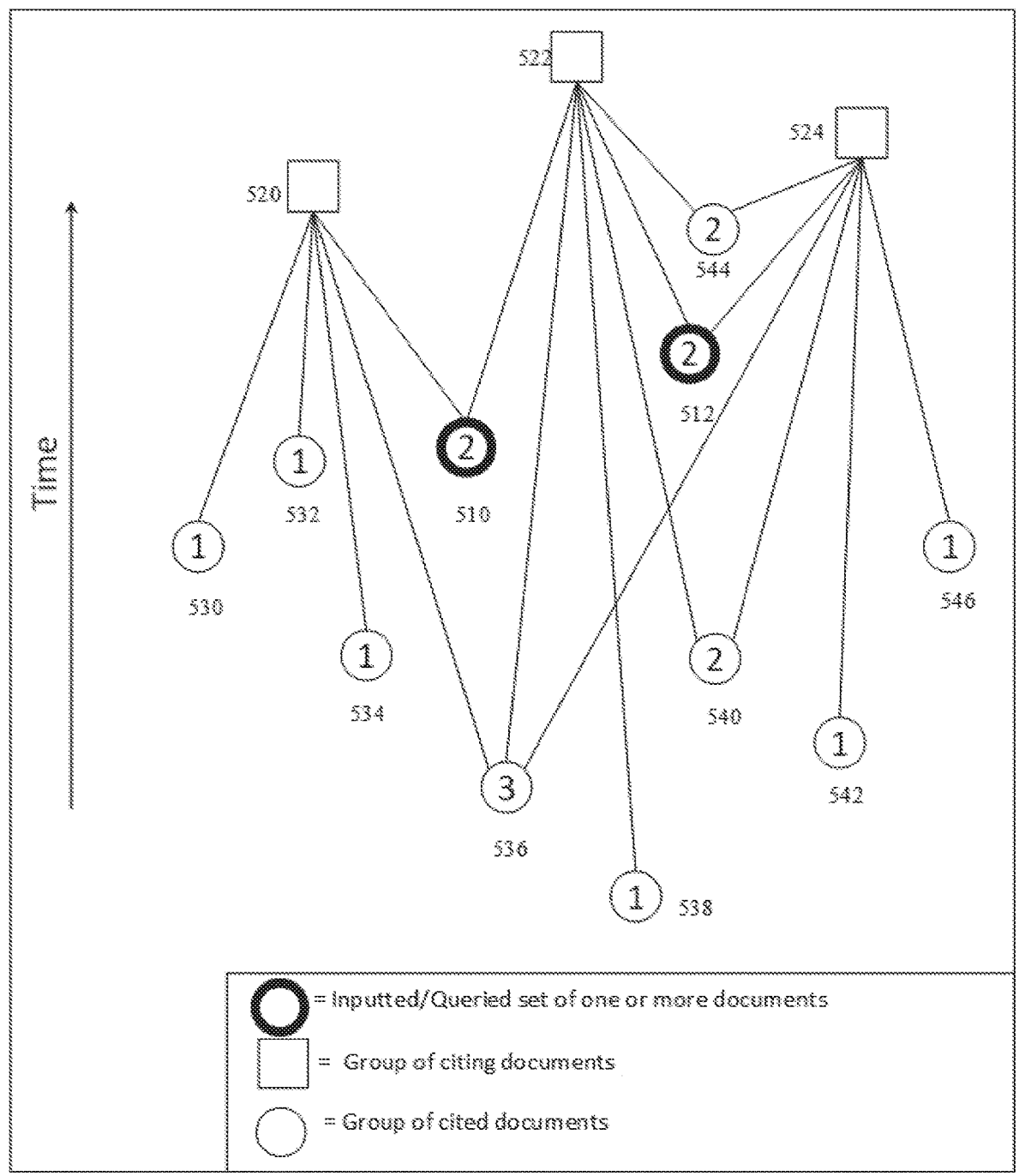
Figure 5E:
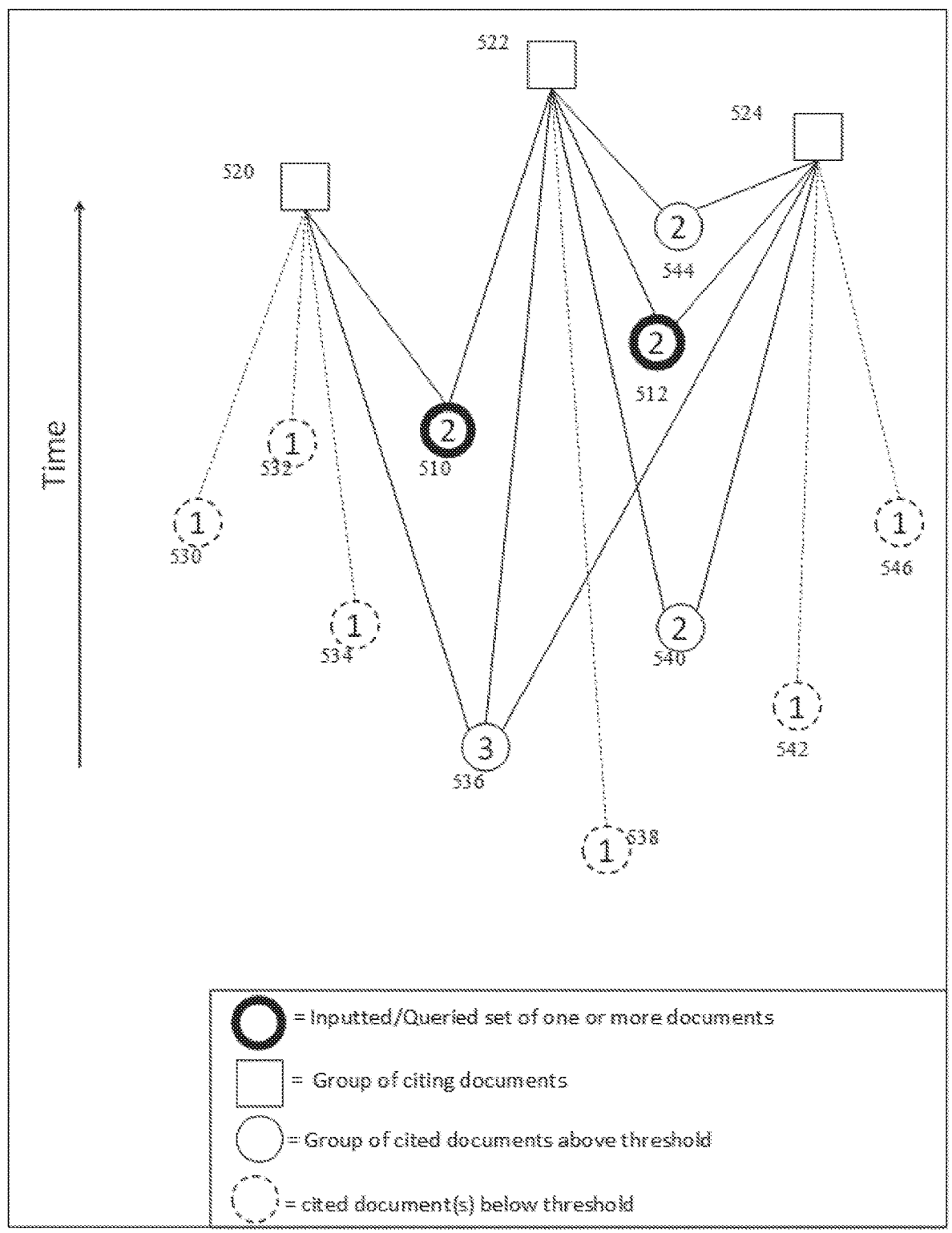

FIGS. 5A-5E show an example of the system 120 determining a set of one or more relevant documents relevant to an inputted/queried set of one or more documents using the method 300 according to embodiments. In this example, a query was received for an inputted/queried set of documents (D1 and D2) 510 and 512. As shown in FIG. 5A, D1 and D2 are relatively "newer" documents (i.e., published more recently). Next, the system 120 may retrieve citation information and determine a group of citing documents for the queried documents (D1 and D2). As shown in FIG. 5B, there are three citing documents (shown as a square), Documents 520, 522 and 524, for the queried documents (D1 and D2) 510 and 512. One of these citing documents, Document 522, cites both D1 and D2. Next, the system 120 may retrieve citation information for the citing documents and determine a group of cited documents for each cited document. FIG. 5C shows the cited documents (Documents 530, 532, 534, 536, 538, 540, 542, 544 and 546) as (non-bold) circles. Next, the system 120 may determine the relevance information for each of the group of cited documents. As shown in FIG. 5D, the system 120 may determine the first relevance score for each cited document. As shown in FIG. 5D, the first relevance scores for the documents range from 1-3, which, in this example, represent the number of citing documents that cite the document together with the Document 510 and/or Document 512. Next, the system 120 may filter the cited documents (Documents 530, 532, 534, 536, 538, 540, 542, 544 and 546) using a relevance threshold. In this example, the relevance threshold is 1. As shown in FIG. 5E, the system 120 determined a set of five documents (e.g., Documents 510, 512, 536, 540, 544) that have a first relevance score greater than the threshold, including the two inputted documents (Documents 510 and 512). The documents with a relevance score of 1 were removed from the group and identified in broken lines. In this example, the system 120 therefore determined that there are three documents (e.g., Documents 536, 540, and 544) that are relevant to the inputted set of two documents (e.g., Documents 510 and 512). Documents 540 and 544 each have a first relevance score of 2 and Document 536 has a first relevance score of 3. These relevant documents may be considered to be a set of one or more relevant documents.

Methods 200, 300 and 350 are shown and explained by way of example only. Some or all of the described steps of methods 200, 300 and 350 may be individually modified or omitted, as well as additional steps may be added. It will be understood that any of these steps may be performed in parallel, in series, or a combination thereof. Unless stated otherwise as apparent from the previous discussion, it will be appreciated that terms such as "filtering," "adding," "calculating," "comparing," "generating," "determining," "obtaining," "processing," "computing," "selecting," "receiving," "summing," "estimating," "retrieving," "outputting," "acquiring," "analyzing," "approximating," "continuing," "resuming," "using," "grouping," "transmitting," "causing," or the like may refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Figure 6:
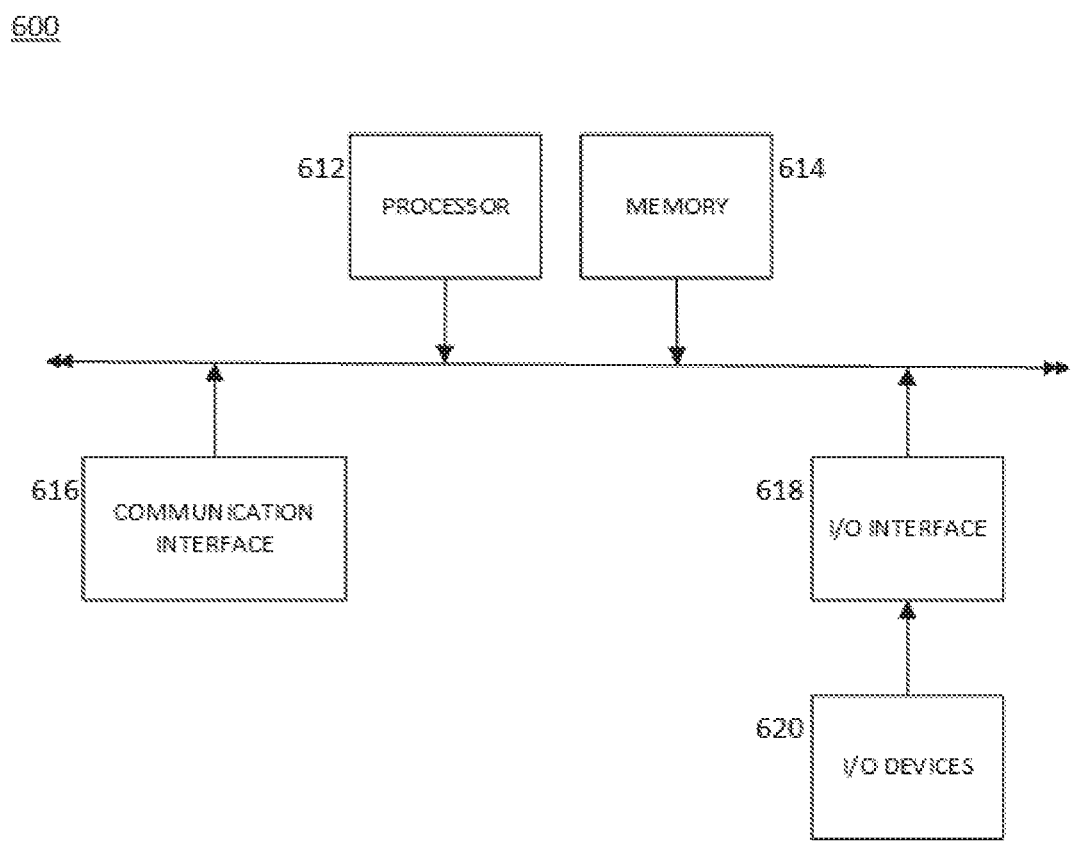
FIG. 6 shows a block diagram illustrating an example of a computing system.

One or more of the devices and/or systems of the system 100 may be and/or include a computer system and/or device. FIG. 6 is a block diagram showing an example of a computer system 600. The modules of the computer system 600 may be included in at least some of the systems and/or modules, as well as other devices and/or systems of the system 100.

The system for carrying out the embodiments of the methods (FIGS. 2 and 3) disclosed herein is not limited to the systems shown in FIGS. 1 and 6. Other systems may also be used. It is also to be understood that the system 600 may omit any of the modules illustrated and/or may include additional modules not shown.

The system 600 shown in FIG. 6 may include any number of modules that communicate with each other through electrical or data connections (not shown). In some embodiments, the modules may be connected via any network (e.g., wired network, wireless network, or a combination thereof).

The system 600 may be a computing system, such as a workstation, computer, or the like. The system 600 may include one or more processors 612. The processor(s) 612 (also referred to as central processing units, or CPUs) may be any known central processing unit, a processor, or a microprocessor. The CPU 612 may be coupled directly or indirectly to one or more computer—readable storage media (e.g., memory) 614. The memory 614 may include random access memory (RAM), read only memory (ROM), disk drive, tape drive, etc., or a combination thereof. The memory 614 may be configured to store programs and data, including data structures. In some embodiments, the memory 614 may also include a frame buffer for storing data arrays.

In some embodiments, another computer system may assume the data analysis or other functions of the CPU 612. In response to commands received from an input device, the programs or data stored in the memory 614 may be archived in long term storage or may be further processed by the processor and presented on a display.

In some embodiments, the system 610 may include a communication interface 616 configured to conduct receiving and transmitting of data between other modules on the system and/or network. The communication interface 616 may be a wired and/or wireless interface, a switched circuit wireless interface, a network of data processing devices, such as LAN, WAN, the internet, or combination thereof. The communication interface may be configured to execute various communication protocols, such as Bluetooth, wireless, and Ethernet, in order to establish and maintain communication with at least another module on the network.

In some embodiments, the system 610 may include an input/output interface 618 configured for receiving information from one or more input devices 620 (e.g., a keyboard, a mouse, and the like) and/or conveying information to one or more output devices 620 (e.g., a printer, a CD writer, a DVD writer, portable flash memory, etc.). In some embodiments, the one or more input devices 620 may be configured to control, for example, the determination of the relevant document results (e.g., report), the display of the relevant document results on a display, the printing of the relevant document results by a printer interface, the transmission of the relevant document results, among other things.

In some embodiments, the disclosed methods (e.g., FIGS. 2 and 3) may be implemented using software applications that are stored in a memory and executed by a processor (e.g., CPU) provided on the system 100. In some embodiments, the disclosed methods may be implemented using software applications that are stored in memories and executed by CPUs distributed across the system.

As such, any of the systems and/or modules of the system 600 may be a general purpose computer system, such as system 600, that becomes a specific purpose computer system when executing the routines and methods of the disclosure. The systems and/or modules of the system 600 may also include an operating system and micro instruction code. The various processes and functions described herein may either be part of the micro instruction code or part of the application program or routine (or combination thereof) that is executed via the operating system.

If written in a programming language conforming to a recognized standard, sequences of instructions designed to implement the methods may be compiled for execution on a variety of hardware systems and for interface to a variety of operating systems. In addition, embodiments are not described with reference to any particular programming language. It will be appreciated that a variety of programming languages may be used to implement embodiments of the disclosure. An example of hardware for performing the described functions is shown in FIGS. 1 and 6. It is to be further understood that, because some of the constituent system components and method steps depicted in the accompanying figures can be implemented in software, the actual connections between the systems components (or the process steps) may differ depending upon the manner in which the disclosure is programmed. Given the teachings of the disclosure provided herein, one of ordinary skill in the related art will be able to contemplate these and similar implementations or configurations of the disclosure.

While the disclosure has been described in detail with reference to exemplary embodiments, those skilled in the art will appreciate that various modifications and substitutions may be made thereto without departing from the spirit and scope of the disclosure as set forth in the appended claims. For example, elements and/or features of different exemplary embodiments may be combined with each other and/or substituted for each other within the scope of this disclosure and appended claims.

What is claimed:

1. A computer-implemented method to determine one or more documents relevant to an inputted set of one or more documents, comprising:
    processing citation information for a queried set of one or more documents to determine a group of one or more citing documents for the queried set, the queried set of one or more documents including the inputted set of one or more documents;
    processing citation information for the group of one or more citing documents for the queried set to determine a group of one or more cited documents for the group of one or more citing documents,
    wherein the group of one or more cited documents includes every cited document for each citing document of the group of one or more citing documents;
    determining relevance information for each cited document of the group of one or more cited documents for the group of one or more citing documents with respect to (i) the group of one or more cited documents for the group of one or more citing documents and/or (ii) the group of one or more citing documents for the queried set; and
    determining a set of one or more relevant documents that is relevant to the inputted set of one or more documents from the group of one or more cited documents for the group of one or more citing documents based on the relevance information.

2. The method according to claim 1, wherein the queried set includes one or more sets of one or more relevant documents relevant to the inputted set.

3. The method according to claim 1, further comprising:
    processing the citation information for the queried set of one or more documents, the queried set including (i) the inputted set of one or more documents and/or (ii) the inputted set of one or more documents and one or more sets of one or more relevant documents, the citation information for each document of the queried set including one or more cited documents and/or one or more citing documents;
    determining a group of one or more cited documents for the queried set and/or the group of one or more citing documents for the queried set;
    determining the relevance information for each document of the group of one or more cited documents for the queried set and/or the group of one or more citing documents for the queried set; and
    determining another set of one or more relevant documents, from the group of one or more cited documents for the queried set and/or the group of one or more citing documents for the queried set, that are relevant to the inputted set of one or more documents based on the relevance information of the group of one or more cited documents for the queried set and/or the group of one or more citing documents for the queried set.

4. The method according to claim 1, wherein the relevance information includes a first relevance score representing a frequency of citation of each document of the group of one or more cited documents for the group of one or more citing documents.

5. The method according to claim 4, wherein the relevance information includes a second relevance score representing relevance of each document of the group of one or more cited documents for the group of one or more citing documents with respect to the group of one or more citing documents for the queried set.

6. The method according to claim 5, further comprising:
    comparing the first relevance score and/or the second relevance score of each document in the group of one or more cited documents for the group of one or more citing documents to a relevance threshold; and
    determining the set of one or more relevant documents based on the comparing.

7. The method according to claim 1, further comprising:
    outputting relevant document results, the relevant document results including the set of one or more relevant documents relevant to the inputted set.

8. The method according to claim 7, wherein the relevant document results include a list of document summaries with hyperlinks to an abstract or a full-text documents for each relevant document.

9. The method according to claim 8, wherein the relevant document results includes a ranking of the one or more relevant documents based on the relevance information.

10. The method according to claim 1, further comprising:
    retrieving the citation information for the queried set, the citation information including the one or more citing documents for the queried set and/or the one or more cited documents for the one or more citing documents;

wherein the group of one or more citing documents for the queried set includes every citing document for each document of the queried set.

11. A non-transitory computer readable storage medium comprising program instructions stored thereon, wherein the program instructions are executable by a computer to cause the computer to determine of one or more documents relevant to an inputted set of one or more documents, by performing steps comprising:

processing citation information for a queried set of one or more documents to determine a group of one or more citing documents for the queried set, the queried set of one or more documents including the inputted set of one or more documents;

processing citation information for the group of one or more citing documents for the queried set to determine a group of one or more cited documents for the group of one or more citing documents, wherein the group of one or more cited documents includes every cited document for each citing document of the group of one or more citing documents;

determining relevance information for each cited document of the group of one or more cited documents for the group of one or more citing documents with respect to (i) the group of one or more cited documents for the group of one or more citing documents and/or (ii) the group of one or more citing documents for the queried set; and determining a set of one or more relevant documents that is relevant to the inputted set of one or more documents from the group of one or more cited documents for the group of one or more citing documents based on the relevance information.

12. The non-transitory computer readable storage medium according to claim 11, wherein the queried set includes one or more sets of one or more relevant documents relevant to the inputted set.

13. The non-transitory computer readable storage medium according to claim 11, further comprising program instructions that, when executed by the computer, cause the computer to perform steps comprising:

processing the citation information for the queried set of one or more documents, the queried set including (i) the inputted set of one or more documents and/or (ii) the inputted set of one or more documents and one or more sets of one or more relevant documents, the citation information for each document including one or more cited documents and/or one or more citing documents;

determining a group of one or more cited documents for the queried set and/or the group of one or more citing documents for the queried set;

determining the relevance information for each document of the group of one or more cited documents for the queried set and/or the group of one or more citing documents for the queried set; and determining another set of one or more relevant documents, from the group of one or more cited documents for the queried set and/or the group of one or more citing documents for the queried set, that are relevant to the inputted set of one or more documents based on the relevance information of the group of one or more cited documents for the queried set and/or the group of one or more citing documents for the queried set.

14. The non-transitory computer readable storage medium according to claim 11, wherein the relevance information includes a first relevance score representing a frequency of citation of each document of the group of one or more cited documents for the group of one or more citing documents.

15. The non-transitory computer readable storage medium according to claim 14, wherein the relevance information includes a second relevance score representing relevance of each document of the group of one or more cited documents for the group of one or more citing documents with respect to the group of one or more citing documents for the queried set.

16. The non-transitory computer readable storage medium according to claim 15, further comprising program instructions that, when executed by the computer, cause the computer to perform steps comprising:

comparing the first relevance score and/or the second relevance score of each document in the group of one or more cited documents for the group of one or more citing documents to a relevance threshold; and determining the set of one or more relevant documents based on the comparing.

17. The non-transitory computer readable storage medium according to claim 11, further comprising program instructions that, when executed by the computer, cause the computer to perform steps comprising:

outputting relevant document results, the relevant document results including the set of one or more relevant documents relevant to the inputted set.

18. The non-transitory computer readable storage medium according to claim 17, wherein the relevant document results include a list of document summaries with hyperlinks to an abstract or a full-text documents for each relevant document.

19. The non-transitory computer readable storage medium according to claim 11, further comprising program instructions that, when executed by the computer, cause the computer to perform steps comprising:

retrieving the citation information for the queried set, the citation information including the one or more citing documents for the queried set and/the one or more cited documents for the one or more citing documents;

wherein the group of one or more citing documents for the queried set includes every citing document for each document of the queried set.

20. A system for determining one or more documents relevant to an inputted set of one or more documents, the system comprising:

at least one processor; and a memory, wherein the processor is configured to cause:

processing citation information for a queried set of one or more documents to determine a group of one or more citing documents for the queried set, the queried set of one or more documents including the inputted set of one or more documents;

processing citation information for the group of one or more citing documents for the queried set to determine a group of one or more cited documents for the group of one or more citing documents, wherein the group of one or more cited documents includes every cited document for each citing document of the group of one or more citing documents;

determining relevance information for each cited document of the group of one or more cited documents for the group of one or more citing documents with respect to (i) the group of one or more cited documents for the group of one or more citing documents and/(ii) or the group of one or more citing documents for the queried set; and determining a set of one or more relevant documents that is relevant to the inputted set of one or more documents based on the relevance information from the group of one or more cited documents for the group of one or more citing documents.

\* \* \* \* \*